United States Patent [19]

Bickhaus

[11] 4,099,504

[45] Jul. 11, 1978

[54] THROTTLE STRUCTURE FOR AN INTERNAL COMBUSTION ENGINE

[75] Inventor: James T. Bickhaus, St. Louis, Mo.

[73] Assignee: ACF Industries, Inc., New York, N.Y.

[21] Appl. No.: 727,713

[22] Filed: Sep. 29, 1976

[51] Int. Cl.² ............................................. F02M 31/00
[52] U.S. Cl. ..................... 123/122 AB; 123/122 AC; 261/144; 261/145
[58] Field of Search ................. 123/122 AB, 122 AC, 123/141; 261/65, 144, 145

[56] References Cited

U.S. PATENT DOCUMENTS

| 1,676,955 | 7/1928 | Kemp | 123/122 AC |
| 3,892,214 | 7/1975 | Hzidacher | 123/122 AB |
| 4,008,699 | 2/1977 | Braun | 123/122 AB |

FOREIGN PATENT DOCUMENTS

| 498,706 | 9/1954 | Italy | 261/65 |
| 563,895 | 9/1944 | United Kingdom | 123/122 AC |

*Primary Examiner*—Ronald H. Lazarus

[57] ABSTRACT

An internal combustion engine is provided with an improved throttle structure. The engine includes a carburetor having an air passageway in it, and an intake manifold interposed between the engine and the carburetor, the carburetor being attached to the intake manifold by any convenient method. The intake manifold includes at least one wall defining a plurality of fluid passageways operatively connected to the carburetor and to the combustion chambers of the engine. In the preferred form of the invention, a cylindrical tube has an axial length chosen so that a first end of the tube extends into the carburetor while a second end extends into the intake manifold. The second end of the tube and the intake manifold define the throttle valve for the engine. The tube is mounted for movement between at least a first closed position where the second tube end is adjacent the wall of the manifold and a second open position where the second tube end is remote from the wall of the intake manifold. Preferably, the intake manifold wall is at least partially defined by a plate adapted to facilitate heat transfer between the intake manifold and an exhaust manifold of the engine, the exhaust manifold being operatively connected to the combustion chambers of the engine.

19 Claims, 8 Drawing Figures

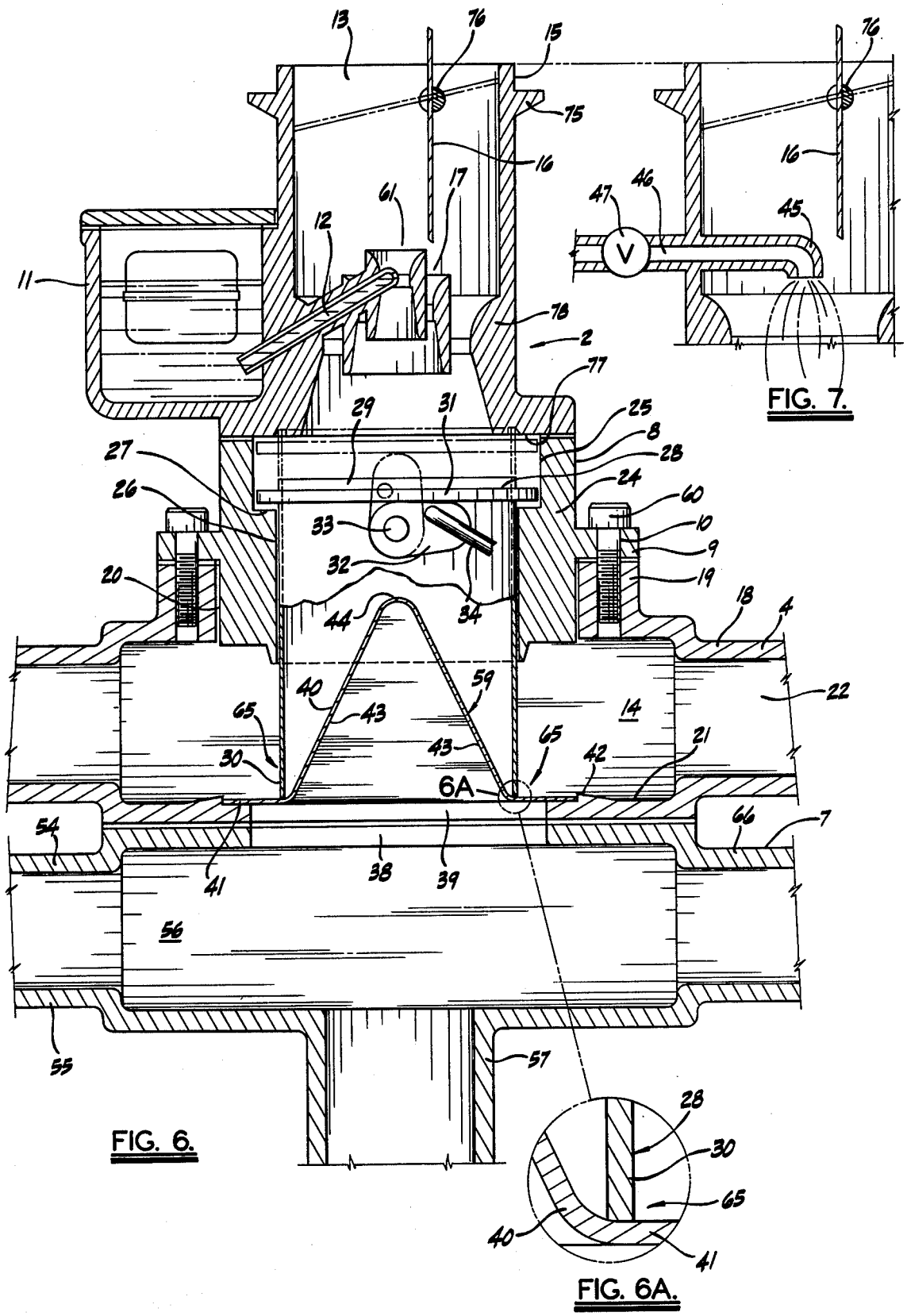

THROTTLE STRUCTURE FOR AN INTERNAL COMBUSTION ENGINE

BACKGROUND OF THE INVENTION

This invention relates to internal combustion engines, and in particular, to an improved throttle structure for controlling fluid passage to the combustion chambers during the intake stroke of the engine.

In the design of internal combustion engines prevalent today, the combustion chambers of the engine are connected to a source of fuel and a source of air through an intake manifold and a carburetor. The carburetor has a main air passageway extending through it, and a venturi restriction is used to draw fuel into the air stream. Control of the flow through the passageway is obtained through use of a throttle valve.

Throttle valves conventionally have included a rotatable plate positioned in the air passageway of the carburetor, downstream of the carburetor venturi. The plate commonly is rotatable between a closed position in which the plate substantially blocks passage of the fuel/air mixture through the carburetor, and an open position which permits passage of fluid past the throttle plate. The carburetor itself usually is positioned above the engine intake manifold. The manifold contains a plurality of passages which are operatively connected to the air passage of the carburetor on one end, and with the combustion chambers of the engine on another end.

It long has been known that the combustion chambers of an engine receive varying amounts of fuel during operation of the engine. Ideally, each intake stroke of the piston would draw a fuel/air mixture into a particular combustion chamber which would burn completely during the power stroke of the piston. In fact, various ones of the engine chambers receive a fluid mixture during intake which varies between each of the combustion chambers in a particular cycle and between individual combustion chambers during different cycles. The reasons for unequal distribution also generally are known. Thus, when fuel and air strike a conventional throttle valve, large droplets of fuel often are formed. Large fuel droplets do not move readily to the combustion chambers, and distort the fuel/air mixture ratio when they do finally arrive. Since the throttle valve commonly is pivotally mounted across the diameter of the carburetor air passage, fluid movement past the throttle is unbalanced or directed toward one side or the other of the air passage. Proper balance is rarely achieved.

The unequal fluid distribution provided by conventional manifold-carburetor constructions is known to reduce the fuel economy of the engine, and to make control of engine pollutants a difficult process. That is to say, control of pollutants in the exhaust of the engine is complicated by the fact that the amount of pollutants varies because of the efficiency or non-efficiency of the power stroke of the engine. In turn, the efficiency depends at least in part on the fuel/air mixture present in the combustion chamber at combustion.

A number of attempts have been made to improve the consistency of the air/fuel mixture delivered to the cylinders of an internal combustion engine. In general, prior art attempts have involved complicated redesigns of the fuel/air delivery system, for example, by the use of fuel injection mechanisms, or complicated redesigns of the engine. While such systems and redesigns work for their intended purposes, they are expensive to produce. Fuel injection mechanisms also are expensive to maintain in normal operational use.

The invention disclosed hereinafter is an improved throttle structure for a conventional carburetor, which may be implemented with little change in carburetor design. Related inventions are disclosed in a copending application by Edward H. Casey, "Means for Imparting Supersonic Flow Characteristics in the Intake Manifold of an Internal Combustion Engine", (Ser. No. 727,719, filed 9/29/76, and a copending application by Donald L. Hicks and Richard D. Doerr, "Throttle Structure for Imparting Supersonic Flow Characteristics in the Intake Manifold of an Internal Combustion Engine", Ser. No. 727,718, filed 9/29/76, assigned to the Assignee of the present invention. Information disclosed in these copending applications is intended to be incorporated by reference. As described more fully hereinafter, the incoming fuel and air mixture, in one embodiment, is permitted to strike the bottom wall of the intake manifold of the engine. A throttle structure, in conjunction with the bottom wall, is utilized to regulate engine demand with fluid flow. The throttle structure permits uniform distribution of the mixture through the intake manifold to an extent heretofore impossible with plate-type throttle valves of the prior art.

One of the objects of this invention is to provide a throttle structure for an internal combustion engine which gives better fuel/air mixture distribution to the cylinders of the engine.

Another object of this invention is to provide a throttle valve structure having an inlet side and an outlet side, the outlet side being positioned in the inlet manifold of an internal combustion engine.

Another object of this invention is to provide a throttle valve structure which utilizes a tubular body member as the valve element.

Yet another object of this invention is to provide a throttle structure which permits heating of the fuel/air mixture prior to fuel/air mixture entrance into the combustion chambers of the engine.

Still another object of this invention is to provide a throttle structure for an internal combustion engine giving improved fuel/air mixture distribution without requiring major design changes in either the carburetor or the intake manifold of the engine.

Other objects of this invention will be apparent to those skilled in the art in light of the following description and accompanying drawings.

SUMMARY OF THE INVENTION

In accordance with this invention, generally stated, an internal combustion engine having an intake manifold operatively connected to the combustion chambers of the engine, and a carburetor operatively connected to the intake manifold, is provided with a throttle structure having an inlet, and an outlet, the outlet being positioned within the intake manifold. In the preferred embodiment, the throttle structure is a tubular member or structure movably mounted between a first position where an end of the tubular structure is adjacent the bottom wall of the inlet manifold, and a second position, where the end of the tubular structure is spaced from the bottom wall of the inlet manifold. Fluid enters the tubular structure from the carburetor and is directed against the bottom wall of the manifold. Flow of the fluid after striking the bottom wall may proceed radially outwardly in all directions in a much more even flow pattern than possible with prior art throttle valves.

Preferably, the bottom wall of the intake manifold includes a thermally conductive plate in heat transfer relationship with the exhaust manifold of the engine so that incoming fluid may be preheated prior to induction in the combustion chamber of the engine.

BRIEF DESCRIPTION OF THE DRAWINGS

In the drawings,

FIG. 6 is an enlarged sectional view, partly broken away, of a carburetor employing a third illustrative embodiment of throttle valve structure of this invention;

FIG. 6a is an enlarged view taken about the area 6a of FIG. 6; and

FIG. 7 is a sectional view, partly broken away, showing a second illustrative fuel supply system for the carburetor shown in FIG. 6.

DESCRIPTION OF THE PREFERRED EMBODIMENT

Figure 1:
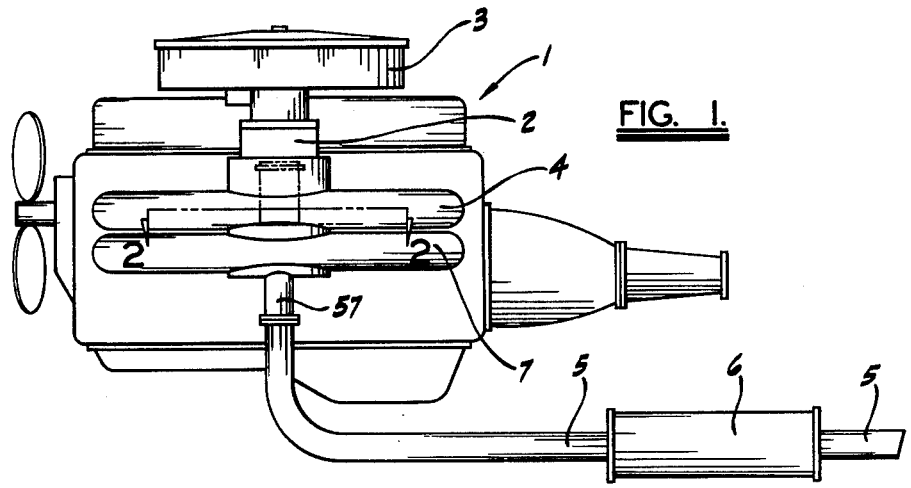
FIG. 1 is view in side elevation, partly broken away, of an internal combustion engine utilizing a carburetor employing a throttle structure of this invention.

Referring now to FIG. 1, reference numeral 1 indicates an internal combustion engine, including a carburetor 2 connected to a source of air through an air cleaner 3. The carburetor 2 also is operatively connected to the combustion chambers of the engine 1 through an intake manifold 4, while the exhaust gas from the combustion chambers of the engine 1 is connected to a tail pipe 5 and a muffler 6 through an exhaust manifold 7.

The carburetor 2 construction is best illustrated in FIG. 6, where it may be observed that the carburetor 2 generally is conventional. It includes a housing 8 having a flange 9 extending outwardly from it. The flange 9 is provided with suitable openings 10 for mounting the housing 8 to the intake manifold 4 with conventional threaded fasteners 60, the fasteners 60 being inserted in corresponding openings in the intake manifold 4. A main air passage 13 extends through the housing 8 and communicates with a distribution passage 14 in the intake manifold 4. The housing 8 also has a fuel bowl 11 associated with it, which is operatively connected to the main air passage 13 along a main fuel passageway 12. The upper portion of the housing 8 of the carburetor 2 defines a carburetor air horn 15. The air horn 15 commonly includes a flange 75 for receiving the air cleaner 3, shown in FIG. 1. Those skilled in the art will recognize that various structural features of the carburetor 2 may be formed integrally with one another, or they may be constructed independently and interconnected by any convenient method.

A conventional butterfly choke valve 16 is pivotally mounted in the passage 13 at 76, upstream of a venturi section 17. The valve 16 operates to control the amount of air entering the passage 13 during various operating conditions of the engine 1. The operation and structure of the choke valve 16 is conventional. Consequently, it is not described in detail.

As indicated, the passageway 12 extends between the fuel bowl 11 and the passage 13, communicating with the passage 13 at the venturi section 17. Venturi section 17 also is conventional, and is not described in detail. In general, a restriction 61, provided at the venturi section 17, causes a pressure drop to exist within the venturi section, which enables the air rushing through the passage 13 to draw fuel from fuel bowl 11 via the passageway 12.

Manifold 4 generally includes a top wall 18 having an annular rim 19 integrally formed with it. The rim 19 defines an opening 20 through the top wall 18, which permits communication between the carburetor passage 13 and the manifold distribution passage 14. The intake manifold 4 also includes a bottom wall 21 and a pair of side walls 22. The top wall 18, bottom wall 21, and side walls 22 define a plurality of inlet ports 23, best seen in FIG. 2, communicating with the combustion chambers of the engine 1. For drawing simplicity, the combustion chambers are not illustrated. While the manifold 4 is illustratively described as having top, bottom and side walls, those skilled in the art will recognize that often the manifold is cylindrical in design, so that the designations indicated in reality may be a single, continuous wall. The designation of top, bottom and side walls, however, facilitates disclosure of the invention.

In prior art internal combustion engines, a throttle valve, usually of a butterfly design, was positioned downstream of the venturi section 17, and upstream of the opening 20 in the manifold 4. The throttle valve acted to control the fuel/air mixture flow through the passage 14 and the ports 23. As indicated above, distribution of the fuel and air mixture has not been optimized in prior art designs. To overcome this deficiency, the throttle valve of this invention modifies the housing 8 of the carburetor structure 2 so that a lower portion 24 of the housing 8 has a first, large internal diameter part 25 and a second, small internal diameter part 26 along the opening 13 in the housing 8, the lower portion 24 itself being sized for reception in the opening 20 formed in the top wall 18 of the manifold 4. The diametric difference between the parts 25 and 26 delimits a stop 27, the stop 27 being useful for purposes later described.

A tubular member or cylinder 28 is slidably mounted within the smaller diameter part 26 of the lower portion 24. Cylinder 28 has a first end 29 and a second end 30. The end 29 has a flange 31 formed in it, which is sized to ride in the diameter part 25 of the housing 8. The flange 31 aids in locating the cylinder 28 during movement. Together with the stop 27 and a stop defined by a wall 77 of an upper housing portion 78, the flange 31 and end 29 act to confine movement of the cylinder 28 to prescribed limits. The particular tubular member shown in the drawings is a right circular cylinder of predetermined size. Other shapes or cylinder forms are compatible with this invention. Thus, other applications may require different cross sectional slopes to effect distribution of the fluid mixture to the engine cylinders. As will be appreciated by those skilled in the art, an "in-line" engine, as shown in FIG. 1, has its carburetor on one side of the manifold 4 with all of the runners to individual combustion chambers extending from the other side of the manifold. On the other hand, a manifold for a "V-type" engine has the carburetor mounted in a central location with runners extending along oppositely opposed directions from the carburetor location. Design of the tubular member may require modification to provide proper fluid distribution while accommodating carburetor location.

A cam means 32 is pivotally mounted at 33 and rotates in response to movement of an arm 34. Cam means 32 abuts a lower side, lower being referenced to FIG. 6, of the flange 31. The arm 34 is operatively connected to a throttle command means, not shown, which may be, for example, the accelerator pedal of a conventional passenger vehicle. The cam means 32 engagement of the flange 31 during rotation thereof operates to move the cylinder 28 between a first position, shown in full lines in FIGS. 3 through 6, and a second position, shown in phantom lines in those Figures.

Figure 2:
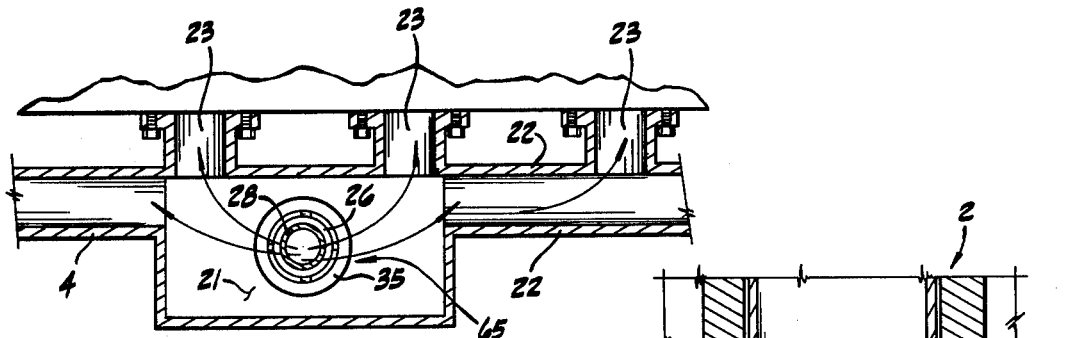
FIG. 2 is a sectional view, partly broken away, taken along the line 2—2 of FIG. 1.
Figure 3:
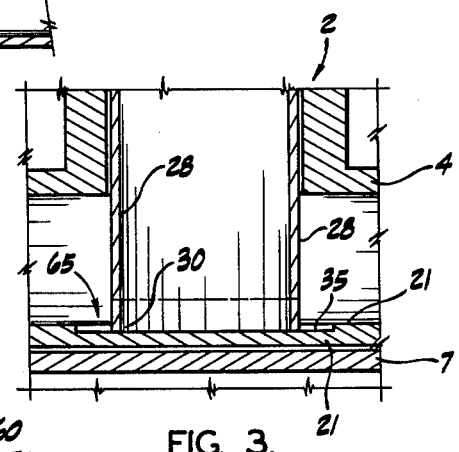
FIG. 3 is a sectional view, partly broken away, of one illustrative embodiment of throttle valve structure used in conjunction with the engine of FIG. 1.

The structure just described is common to the various embodiments of this invention shown in FIGS. 2 through 6. Specific variations are utilized to accomplish specific objectives of this invention. Thus, for example, in FIG. 3, the cylinder 28 has an axial length chosen so that the cylinder extends into and is capable of abutting the bottom wall 21 of the intake manifold 4. The bottom wall 21 of the manifold 4 may be machined, as indicated at 35 in FIG. 3, to ensure proper abuttment of the end 30 of the cylinder 28 with the bottom wall 21. The end 30 of the cylinder 28, together with the wall 21 of the manifold 4, define a throttle valve 65 for the carburetor 2. As shown in FIG. 3, the end 30 of the cylinder 28 is essentially flat fitting with the bottom wall 21. Movement of the cylinder controls valve operation.

As best observed in FIG. 2, use of the cylinder 28 permits fuel passing through the carburetor 2 to strike the bottom wall 21 along the machined area 35, and to expand radially outwardly along the bottom wall 21 of the intake manifold 4. This has offered considerably better distribution to the inlet ports 23 of the manifold 4 than has been available with prior art throttle valves. As is apparent, valve 65 operation occurs in the movement of the cylinder 28 toward and away from the wall 21.

Figure 5:
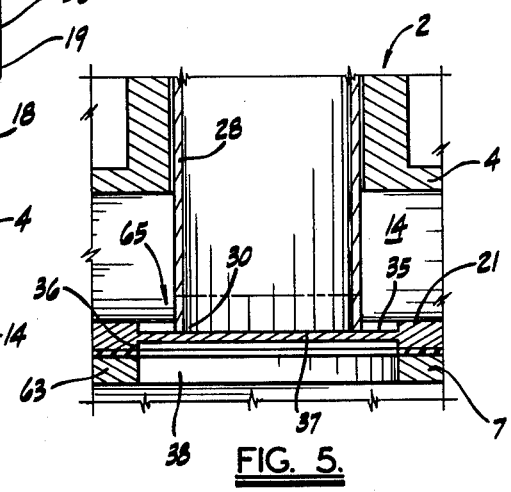
FIG. 5 is a sectional view, partly broken away, of the throttle valve structure of FIG. 3, showing a modification which permits heat transfer between an intake manifold and an exhaust manifold of the engine shown in FIG. 1.

FIG. 5 illustrates a variation in the design of the area of manifold 4 forming a part of the throttle valve 65 of the carburetor 2. In FIG. 5, the bottom wall 21 of the intake manifold 4 includes the machined area 35 on the passageway 14 side of the manifold 4, and a machined area 36 on the outboard side of the intake manifold 4, which combine to produce a relatively thin membrane 37 between them. In the embodiment of FIG. 5, the exhaust manifold 7 includes a top wall 63 having an opening 38 formed in it. The opening 38 permits hot exhaust gas from the combustion chambers of the engine 1 to contact the membrane 37. The membrane 37, in turn, permits relatively rapid heat transfer to occur between the exhaust manifold and the passageway 14 side of the intake manifold 4. Heat from the exhaust manifold 7 vaporizes any liquid gasoline in the fuel/air mixture, which also aids in the ability of the carburetor 2 and the throttle valve 65 of this invention to improve fuel/air distribution to the ports 23 of the intake manifold 4.

Exhaust manifold 7 is conventional and includes the top wall 66, a bottom 55, and a pair of sides 56. The tail pipe 5 and the muffler 6 are attached to the exhaust manifold 7 along a stub connection 57 in a conventional manner.

FIG. 6 illustrates a variation of the method and means for providing heat transfer between the exhaust and intake manifolds. As shown in FIG. 6, the exhaust manifold 7 has the opening 38 formed in it. In addition, the intake manifold 4 has an opening 39 formed in the bottom wall 21, the opening 39 being axially aligned with the opening 38. The opening 39, however, is closed by a plate 40, which prevents communication between the intake and exhaust manifolds.

Plate 40 includes an annular base 41 which is attached to the intake manifold 4 by any convenient method. Staking the plate 40 within the opening 39, as indicated at 42, works well, for example. A heat transfer cone 59 extends upwardly from the base 41. Cone 59 includes a side wall 43 extending to an apex 44 in a conventional manner. The side wall 43 surface area, being larger than the area of the membrane 37, greatly increases the heat transfer capacity of the floor plate 40. That added heat transfer capacity ensures vaporization of fuel droplets in the fuel/air mixture as that mixture passes through the throttle valve 65. It should be noted that the plate 40, being symmetrical with respect to the air passage 13, enables the throttle valve 65 to maintain the radial flow characteristics of the fuel/air mixture after that mixture strikes the plate 40. Again, the cylinder 28 is flat fitting with the plate 40, as is best seen in FIG. 6a.

The carburetor 2 structure described above utilizes a conventional venturi section 17 and air passageway 13 to draw fuel into air passing through the venturi section. Those skilled in the art will recognize that the venturi section 17 may be replaced by a nozzle 45 connected to a source of fuel through a conduit 46. The conduit 46 is provided with pressure means to pump fuel under pressure into the passageway 13 in accordance with some load demand on the engine 1 as controlled by a valve 47. Such an arrangement is illustrated in FIG. 7, and demonstrates that the throttle valve 65 of this invention is compatible with a broad range of fuel supply means.

Figure 4:
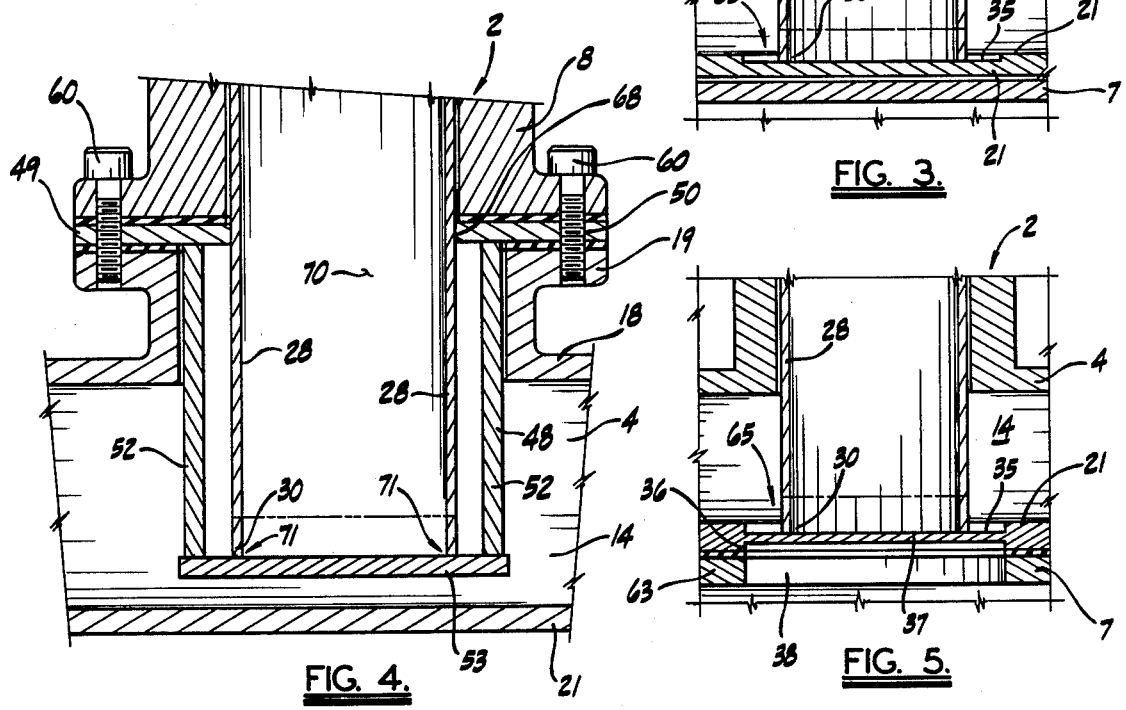
FIG. 4 is a sectional view, partly broken away, of a second illustrative embodiment of throttle valve structure of this invention.

The embodiments of the throttle valve 65, described above, do require some modification of at least existing intake manifolds for their implementation, although that modification is considerably less than experienced with other prior art devices. FIG. 4 illustrates a throttle valve 71, which may be utilized directly with presently available intake manifolds. Like numerals have been utilized for like parts, where appropriate. In the particular embodiment of FIG. 4, a drop-in structure 48 includes an annular flange 49. The flange 49 has a central opening 68 in it, the opening 68 being axially aligned and communicating with the passage 13. The flange 49 also has a plurality of openings 50 in it, which receive the conventional fasteners 60 to mount the flange 49 between the housing 8 and the rim 19 of the intake manifold 4. A plurality of studs 52 are attached to the flange 49 and extend downwardly from it, so that the studs 52 project into the distribution passage 14 of the intake manifold 4. A plate 53 is attached to the studs 52 by any convenient method. For example, the studs 52 may be press fit or threaded onto the plate 53. The plate 53 and the end 30 of the cylinder 28 define the throttle valve 71 for the internal combustion engine 1. As may be observed in FIG. 4, the advantage of this embodiment is that the entire drop-in structure 48 may be attached to the carburetor 2 and inserted in the intake manifold 4, without any modification to the intake manifold. Operation of the throttle valve 71 is similar to that described for the valve 65.

Numerous variations, within the scope of the appended claims, will be apparent to those skilled in the art in light of the foregoing description and accompanying drawings. Thus, while the throttle valves 65 and 71 were described as including a cylinder 28 of right circular design, other geometric bodies or cylinder designs are compatible with the broader aspects of this invention. The important consideration is that the valve action of the throttles 65 and 71 occur within the intake manifold 4, which greatly improves the ability of the carburetor 2 to distribute the proper fuel/air mixture to the cylinders of the engine 1. Likewise, various conventional structural features described in conjunction with the carburetor 2 may vary in other embodiments of this invention. For example, it is conventional to utilize a plurality of venturi sections in some carburetor designs. In like manner, independent idle circuit fuel supply means may be incorporated with the carburetor 2 in other embodiments of this invention. Presently, however, idle fuel supply is obtained by proper positioning of the cylinder 28. As indicated, an independently powered main fuel circuit may be used in place of the venturi circuit described. Other designs for the plate 40 may be used. Likewise, the membrane 37 may be replaced by a flat floor plate, if desired. The machined area 35 is utilized merely to ensure proper contact between the end 30 and the wall 21. Where the wall 21 is smooth after manufacture of the manifold, the area 35 may be eliminated. These variations are merely illustrative.

Having thus described the invention, what is claimed and desired to be secured by Letters Patent is:

1. A fluid supply system for an internal combustion engine, comprising:
  an intake manifold, said intake manifold including an enclosure, said enclosure defining a plurality of fuel ports and a distribution passage, said intake manifold having at least one opening in it for communicating with a carburetor, said inlet manifold including a bottom wall;
  a carburetor, said carburetor having a main air passage communicating with the opening in said intake manifold and said distribution passage, means for injecting fuel into said main air passage, and a throttle structure operable from a fully closed to an open position for controlling fluid flow through said intake manifold in response to demands made on said engine, said throttle structure being mounted to said carburetor so as to extend into said intake manifold, said throttle structure having an outlet side in said intake manifold.

2. The fluid supply system of claim 1 wherein the bottom wall of said intake manifold has an opening in it, said opening being axially aligned with the main air passageway of said carburetor, and a floor plate mounted along said intake manifold so as to close said opening, said throttle structure coacting with said plate to vary fluid flow in said distribution passage.

3. The fluid supply system of claim 2 wherein said floor plate extends upwardly from the bottom wall of said intake manifold.

4. The fluid supply system of claim 3 wherein said floor plate has a conical shape in cross section.

5. The fluid supply system of claim 4 wherein said throttle structure includes a cylindrical section having a first end located in said carburetor, and a second end positioned in said intake manifold, said cylindrical section being movable between at least a first position wherein said second end approximately abuts said plate, and a second position wherein said second end is removed from said plate, and means for moving said cylinder between said first and said second position.

6. The fluid supply system of claim 1 wherein said carburetor includes drop-in means adapted to be positioned within said intake manifold, said drop-in means including a plate, and means for attaching said plate to said carburetor, said throttle means including a cylinder, said cylinder having a first end located in said carburetor, and a second end located in said intake manifold, said second end being movable between at least a first position wherein said second end approximately abuts the plate of said drop-in means, and a second position wherein said cylinder is remote from the plate of said drop-in means.

7. In a fuel supply system for an internal combustion engine having an intake manifold for distributing fuel to the engine, the intake manifold having an enclosure including at least one side wall defining a plurality of passages for conducting fuel to said engine, and a carburetor structure for supplying a fuel/air mixture to said manifold, said carburetor structure including fuel supply means, and an air passage in said carburetor structure operatively connected to said fuel supply means and said intake manifold, the improvement which comprises throttle structure means operable from a fully closed to an open position for regulating fluid flow through said intake manifold, said throttle structure means having an inlet end and an outlet end, the outlet end of said throttle structure means being located in said inlet manifold, and means in said inlet manifold for cooperating with the outlet end of said throttle means to regulate fluid flow through said intake manifold.

8. The improvement of claim 7 wherein said cooperating means in said inlet manifold includes a drop-in means adapted to project within said inlet manifold, said drop-in means including a plate, and means for attaching said plate to said carburetor structure, said throttle structure means having a first end mounted in said carburetor structure, and a second end positioned in said intake manifold, said second end being movable between at least a first position wherein said second end approximately abuts the plate of said drop-in means, and a second position wherein said cylinder is remote from the plate of said drop-in means.

9. The improvement of claim 7 wherein said intake manifold includes a bottom wall, said bottom wall having a smooth area formed in it, said smooth area being axially aligned with the air passage in said carburetor structure, said throttle structure coacting with said smooth area to vary fluid flow in said plurality of fuel passages.

10. The improvement of claim 7 wherein said intake manifold includes a bottom wall, said bottom wall having an opening in it, and a floor plate mounted along said intake manifold so as to close the opening in said bottom wall, said throttle structure coacting with said floor plate to vary fluid flow in passage plurality of the intake manifold.

11. The improvement of claim 10 wherein said floor plate extends upwardly from the plane of the bottom wall of said intake manifold, said floor plate being conic in cross section.

12. The improvement of claim 11 wherein said engine includes an exhaust manifold adjacent said intake manifold, said intake manifold having an opening in it communicating with said exhaust manifold, said floor plate being mounted in said opening and closing communication between said intake and said exhaust manifolds, said plate being constructed from a heat conductive material, said throttle structure coacting with said plate to regulate fluid flow through said intake manifold.

13. The improvement of claim 12 wherein said throttle structure means is a cylindrical tube.

14. A fuel supply system for an internal combustion engine, comprising:
an intake manifold for distributing fluid to the engine, said manifold having an enclosure, said enclosure including at least one wall defining a plurality of fluid passages in said manifold;
a carburetor structure for supplying a fuel/air mixture to said intake manifold, said carburetor structure having an air passage in it operatively connected to said intake manifold, fuel supply means operatively connected to said air passage, and means for mixing fuel and air in said passage upstream of said intake manifold; and
throttle valve means operable from a fully closed to an open position for controlling fluid flow through said intake manifold mounted in said intake manifold.

15. The fuel supply system of claim 14 wherein said throttle valve means includes a drop-in structure adapted to project within said inlet manifold, said drop-in means including a plate and means for attaching said plate to said carburetor structure, and a tubular device having a first end mounted in said carburetor structure, said tubular device having a second end positioned in said intake manifold, said second end being movable between at least a first position wherein said second end approximately abuts the plate of said drop-in means, and a second position wherein said tubular device is remote from the drop-in structure.

16. The fuel supply system of claim 14 wherein said intake manifold includes a bottom wall, said throttle valve means coacting with said bottom wall to vary fluid flow in said plurality of fuel passages.

17. The fuel supply system of claim 16 wherein said bottom wall is at least partially defined by a plate attached to the intake manifold.

18. The fuel supply system of claim 14 wherein said throttle valve means comprises a tubular structure having a first end and a second end, said second end being positioned in said inlet manifold and defining an outlet for said throttle valve means.

19. The fuel system of claim 18 wherein said tubular structure comprises a right circular cylinder.

* * * * *